Nov. 23, 1965  J. MICHEL  3,218,987
MEAT HAULING BODY CONSTRUCTION
Filed April 4, 1963  2 Sheets-Sheet 1

INVENTOR.
JOSEPH MICHEL
BY Robb & Robb
attorneys

Nov. 23, 1965  J. MICHEL  3,218,987
MEAT HAULING BODY CONSTRUCTION
Filed April 4, 1963  2 Sheets-Sheet 2
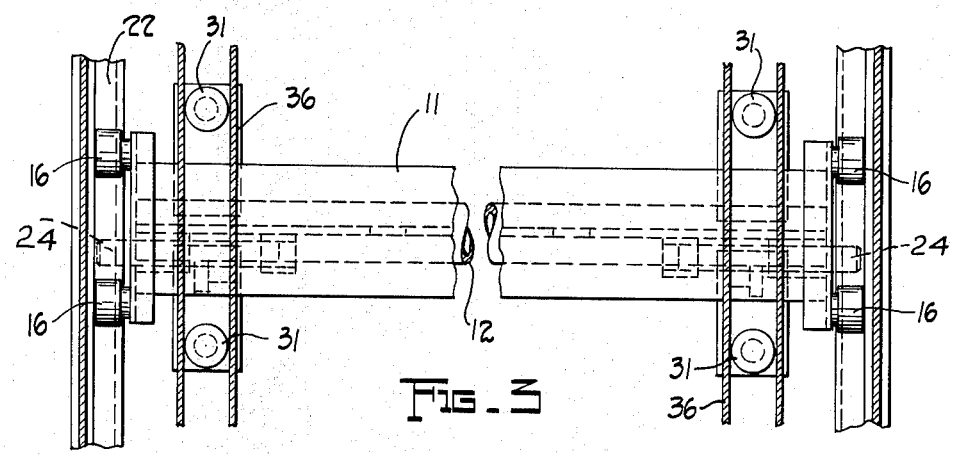
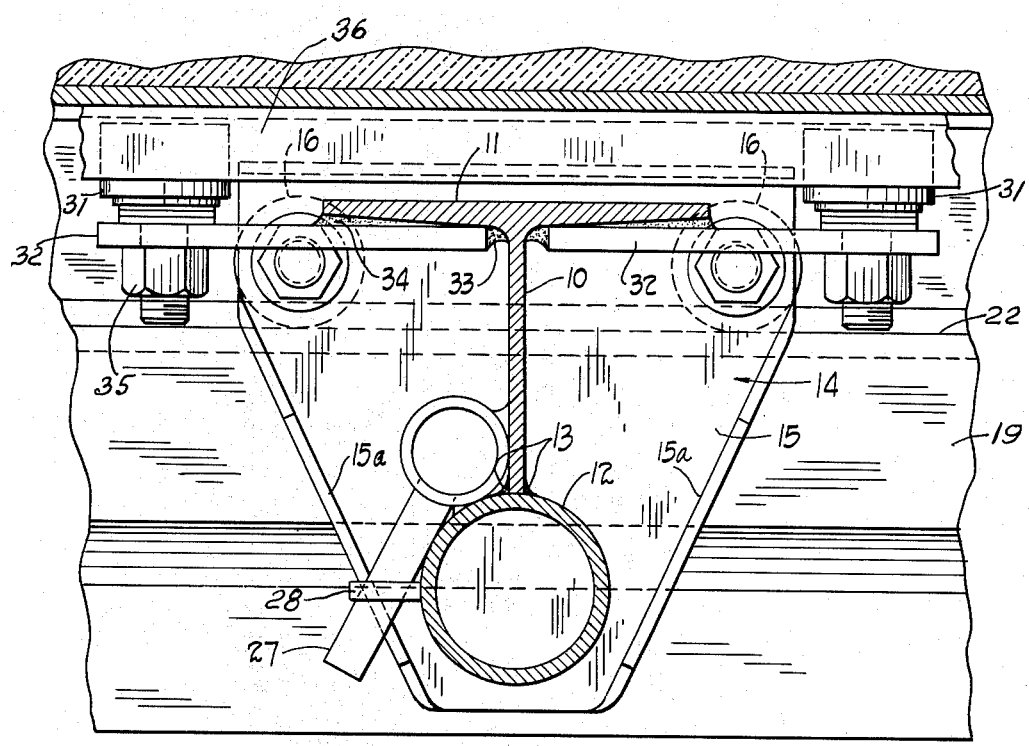
INVENTOR.
JOSEPH MICHEL
BY Robb+Robb
attorneys United States Patent Office 3,218,987
Patented Nov. 23, 1965

3,218,987
MEAT HAULING BODY CONSTRUCTION
Joseph Michel, Hazleton, Pa., assignor to Highway Trailer Industries, Inc., Edgerton, Wis., a corporation of Delaware
Filed Apr. 4, 1963, Ser. No. 270,718
5 Claims. (Cl. 104—98)

This invention relates to meat hauling body construction, and more particularly to the portion of the body which is devoted to supporting a rolling meat beam thereon, said meat beam being adapted to support large quantities of meat in the known manner as by meat hooks suspended therefrom.

Even more particularly this invention relates to the manner of mounting the meat beam in the body so that greater loads of meat may be suspended therefrom and the meat moved in and out on the beam, that is fore and aft in the body, whereby the meat may be made accessible as successive deliveries are made thereof.

In the usual meat hauling body, a series of beams is usually provided, mounted near the upper portions of the side walls and just beneath the top thereof, whereby meat in large pieces may be suspended therefrom by meat hooks impaled in the said meat, this necessitating the positioning of the meat on the rails by main force and obviously requiring a substantial amount of handling which is obviated by the concept herein.

Generally speaking, the invention hereof comprises a rolling meat beam, mounted in a somewhat conventional manner but particularly arranged to move fore and aft in the body and when large quantities of meat are suspended therefrom as may be the case in the instance of several hundreds of pounds, it has been found that the meat beam may become angularly disposed and thus actually in such a condition that the beam becomes impossible to move without resorting to special tools to position the same or to other means which would not normally be available.

It is therefore a principal object of this invention to provide a rolling meat beam which will be maintained at constantly positioned right angle to the longitudinal disposition of the body, whereby the meat beam cannot become "cocked" in such a manner as to become immovable, but on the other hand will always be easily moved irrespective of the quantity of meat suspended therefrom.

It is a further object of this invention to provide a meat beam of simple and yet very strong construction which will support the large quantities of meat therefrom, be easily rolled back and forth in the body, and arranged so that the beam will always remain at or sufficiently near right angles to its longitudinal direction of movement that it will not become wedged in such a manner as to become immovable.

A more specific object of this invention is to provide a rolling meat beam which is equipped with suitable rollers at each end thereof to support the same, these rollers moving in or on suitable longitudinal rails provided therefor, additional rollers being provided at right angles to the rollers first described so that they may act as guide rollers, operating in a guide rail likewise extending longitudinally, so that the beam will remain at or very nearly right angles to the direction of movement and thus prevent its becoming difficult to be moved.

Other and further objects of the invention will be understood from a consideration of the specification appended hereto and disclosed in the drawings wherein:

FIGURE 3 is a transverse sectional view taken about on the line 3—3 of FIGURE 2 looking in the direction of the arrows.

FIGURE 4 is a longitudinal sectional view, fragmentary in nature, taken about on the line 4—4 of FIGURE 2 looking in the direction of the arrows.

Figure 1:
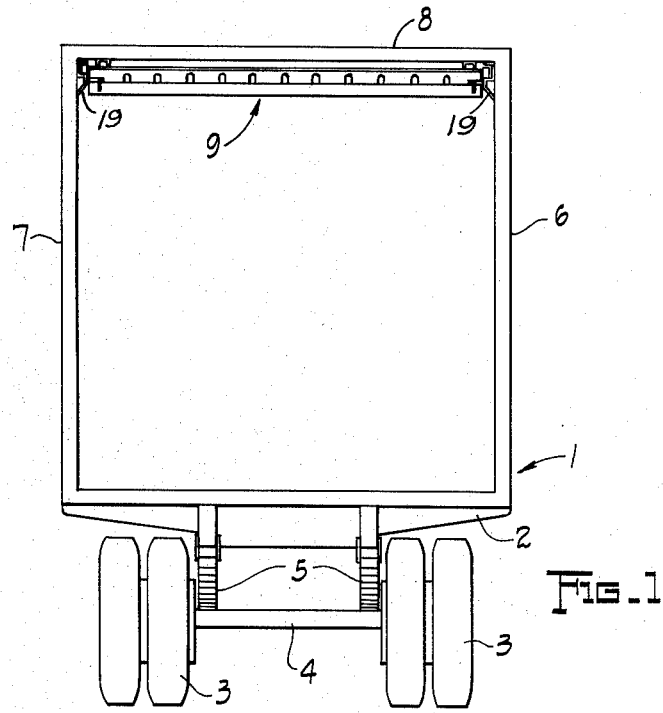
FIGURE 1 is a rear elevational view showing the meat beam of this invention installed in a somewhat conventional body.

Referring now to FIGURE 1, the body generally denoted 1 hereof is mounted on the usual truck chassis 2 supported by dual rear wheels such as 3, the usual axle 4 being provided therefor and the body being mounted on the springs 5 as is well known.

The body 1 is provided with the upstanding generally parallel sides 6 and 7, which are in turn connected at their upper ends by a top 8 which is coextensive with the sides and in general similar to the well known type of truck body.

Figure 2:
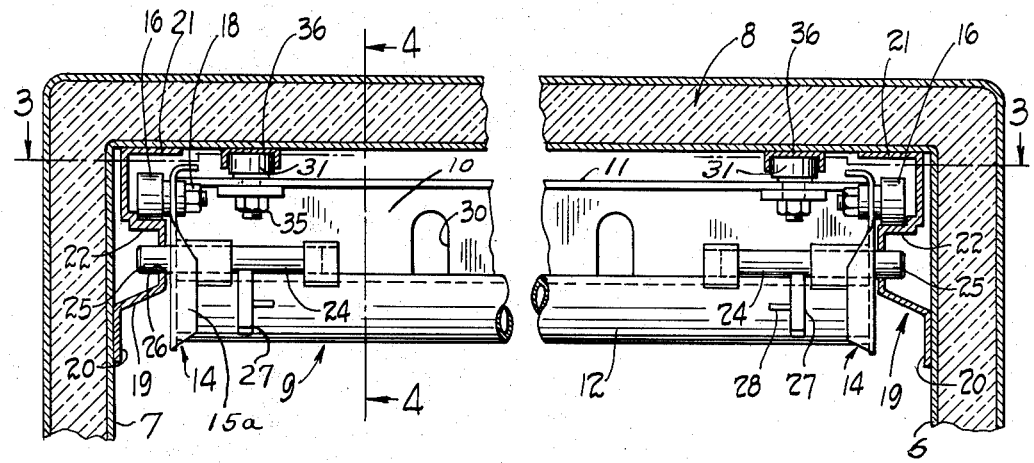
FIGURE 2 is an enlarged fragmentary sectional view through the body, showing the beam and greater details thereof.

Referring now to FIGURE 2, which shows a fragmentary sectional view and more particularly the portions of the meat beam to which this invention is directed, the meat beam is shown as generally designated at 9, this being comprised of a T-shaped member extending transversely having the vertical body portion 10 and the transverse flange 11 integral therewith, the body portion 10 being in turn connected at its lower extremity with a tubular member 12, as by welding at 13 in a generally conventional manner.

At opposite ends of the T-shaped member, are suitable mounting parts of what may be termed generally triangular configuration indicated at 14 including a body portion 15 with flanges 15a provided to effect stiffening and the member 14 as a whole being suitably fastened at each end, as indicated in FIGURE 2.

The mounting parts 14 are equipped with suitable rollers 16, these being provided in pairs, as indicated in FIGURE 4 and fastened to the mounting parts in any well known manner as by axle portions thereof which are equipped with nuts such as 18 the rollers 16 being mounted on shafts which may be fastened as indicated in the various figures by the nuts 18.

The rollers 16 are intended to be supported on longitudinal support rails 19, these being fastened at their lower extremities as indicated in FIGURE 2 by the flange portions 20 thereof, the upper portions being equipped with inturned flanges 21 fastened to the top 8 in any preferred manner.

It will be apparent that the longitudinal support rails 19 are preferably extrusions and for convenience may be of the form herein disclosed, which provide track portions at 22 to support the rollers 16 thereon.

In order to position the beam unit 9 with respect to the longitudinal disposition desired, suitable bolts 24 may be provided, these having end portions 25 adapted to enter suitable openings 26 formed in the longitudinal rails 19, and the bolts further being equipped with handles 27 by which the bolts may be manipulated with suitable lock or stop members 28 being provided to maintain the bolts in position in engagement with the openings 26 which are desired to be availed of for positioning the beam in its longitudinal relationship. It will be apparent that by suitable manipulation of the handles 27 such as is indicated by FIGURE 4, the bolts may be moved inwardly and outwardly so as to effect the locating operation and likewise be locked in position in either location so that they are susceptible of functioning in the manner desired.

It should be pointed out that the web 10 of the T member is equipped with suitable openings 30 which are adapted to receive the hook portions of meat hooks which will normally rest or be suspended on the tubular members 12, a number of these openings 30 being provided along the tubular member 12 so that a number of the hooks may be carried thereby and obviously the meat suspended therefrom.

Without more, the beam unit 9 hereinbefore described generally, would normally move fore and aft on the support rails 19 but often times would become cocked or wedged so that it cannot be moved at all irrespective of the amount of force used therefor without special tools to free the same for such movement.

Therefore the unit hereof is provided with suitable guide instrumentalities or means which are arranged in the form of longitudinally positioned guide rollers 31 being provided in pairs at the opposite ends of the beam unit, these rollers 31 being supported in offstanding arm members 32 suitably secured to the upper flange 11 of the T member 9 as by welding indicated at 33 and 34 or similarly fastened as will best suit the arrangement.

These guide rollers 31 are in turn fastened to the members 32 by suitable nut members 35 in a manner similar to the manner in which the rollers 16 are fixed to the mounting parts 14 and in turn arranged to slidingly engage in longitudinal guide rails 36, being provided in pairs and sufficiently near the ends of the beam unit 9 so that a guiding effect is obtained under the most difficult circumstances which would be those tending to cock or cause the beam to assume an angular disposition with respect to the longitudinal direction of movement other than 90 degrees.

In view of the foregoing it will be seen that these guide rollers 31 and the guide rails 36 in which they move, will effectively prevent any distortion of the beam unit which would prevent further movement as has previously been suggested and thus the purpose of the invention has been and is accomplished thereby.

I claim:

1. In body construction of the class described, in combination, a body including spaced sides, a top co-extensive therewith and extending therebetween, a meat beam unit extending between the sides for movement longitudinally thereof, support means comprising members extending along and connected to the sides, support parts at the ends on the unit engaging the unit to facilitate the movement aforesaid, parallel and coplanar guide means connected to and extending longitudinally of the body, and guide parts on opposite sides of and rigidly fixed to the beam near the ends engaging the guide means aforesaid to maintain the unit at right angles to its path of travel.

2. The combination as claimed in claim 1, wherein the guide means comprise a pair of rails extending longitudinally of the top and spaced inwardly of the ends of the unit, and the guide parts include rollers mounted on the beam unit in engagement with the rails.

3. The combination as claimed in claim 1, wherein the beam unit consists of a transverse T-shaped member, a tubular support is fixed thereto at the lower portion thereof, mounting parts are fixed at opposite ends of the T-shaped member, the support parts comprise pairs of rollers on the mounting part, and the guide means consist of pairs of longitudinally spaced guide rollers fixed to the T-shaped member and guide rails fixed to the top, said guide rollers being movable therein when the beam unit is moved along the members extending along the sides.

4. The combination as claimed in claim 3, wherein means consisting of bolts engageable with suitable openings in the rails are provided to position the beam unit along the side members in a plurality of longitudinal positions.

5. In body construction of the class described, in combination, a body including spaced sides, a top co-extensive therewith and extending therebetween, a meat beam unit extending between the sides for movement longitudinally thereof, support means comprising members extending along and connected to the sides, support parts at the ends on the unit engaging the unit to facilitate the movement aforesaid, guide means connected to and extending longitudinally of the body, and guide parts rigidly fixed to the beam near the ends thereof and spaced a substantial distance from the longitudinal axis of the beam unit and engaging the guide means aforesaid to maintain the unit at right angles to its path of travel, the members extending along the sides comprising rails fixed to the sides and top, and the support parts consisting of rollers movable along track portions intermediate the connections of the rails with the sides and top.

References Cited by the Examiner
UNITED STATES PATENTS

| 1,758,580 | 5/1930 | Moore | 105—163 |
| 1,869,421 | 8/1932 | Harris | 104—98 |
| 2,215,427 | 9/1940 | Nelles | 104—98 |
| 2,556,503 | 6/1951 | Nelson | 104—1 |
| 2,601,831 | 7/1952 | Caillard | 104—50 |
| 2,752,864 | 7/1956 | McDougal et al. | 105—376 |
| 2,833,588 | 5/1958 | Black | 105—37 X |

MILTON BUCHLER, *Primary Examiner.*

LEO QUACKENBUSH, *Examiner.*